(12) United States Patent
Williams et al.

(10) Patent No.: US 6,738,924 B1
(45) Date of Patent: May 18, 2004

(54) FULL SLIP DEFECT MANAGEMENT SYSTEM USING TRACK IDENTIFICATION

(75) Inventors: Steven S. Williams, Longmont, CO (US); Stanton M. Keeler, Longmont, CO (US); Daniel S. Fisher, Longmont, CO (US); Mike B. Propps, Loveland, CO (US); Edward S. Hoskins, Longmont, CO (US)

(73) Assignee: Seagate Tech. LLC, Scotts Valley, CA (US)

( * ) Notice: Subject to any disclaimer, the term of this patent is extended or adjusted under 35 U.S.C. 154(b) by 0 days.

(21) Appl. No.: 09/483,341

(22) Filed: Jan. 14, 2000

Related U.S. Application Data
(60) Provisional application No. 60/116,070, filed on Jan. 15, 1999.

(51) Int. Cl.[7] .................................................. G06F 11/00
(52) U.S. Cl. ................................. 714/7; 714/8; 714/27
(58) Field of Search .............................. 714/7, 27, 8, 5, 714/3; 369/47.14, 53.15–17

(56) References Cited

U.S. PATENT DOCUMENTS

| | | | | |
|---|---|---|---|---|
| 4,498,146 A | | 2/1985 | Martinez ..................... 364/900 |
| 4,796,113 A | * | 1/1989 | Hayakawa .................. 714/710 |
| 4,914,530 A | | 4/1990 | Graham et al. ............... 360/48 |
| 5,075,804 A | * | 12/1991 | Deyring ....................... 360/49 |
| 5,271,018 A | | 12/1993 | Chan ......................... 371/10.2 |
| 5,285,327 A | | 2/1994 | Hetzler ......................... 360/48 |
| 5,313,626 A | * | 5/1994 | Jones et al. ..................... 714/5 |
| 5,404,357 A | | 4/1995 | Ito et al. ..................... 371/21.2 |
| 5,500,940 A | * | 3/1996 | Skeie .......................... 714/25 |
| 5,740,358 A | | 4/1998 | Geldman et al. ....... 395/184.01 |
| 5,761,064 A | | 6/1998 | La et al. ................. 364/468.17 |
| 5,798,883 A | | 8/1998 | Kim ............................ 360/31 |
| 5,818,654 A | | 10/1998 | Reddy et al. ................. 360/53 |
| 5,844,911 A | | 12/1998 | Schadegg et al. .......... 371/10.2 |
| 5,848,438 A | | 12/1998 | Nemazie et al. ............ 711/201 |
| 5,974,544 A | * | 10/1999 | Jeffries et al. ................. 713/1 |
| 5,983,309 A | * | 11/1999 | Atsatt et al. ................... 711/4 |
| 6,025,966 A | | 2/2000 | Nemazie et al. ............. 360/53 |
| 6,049,515 A | * | 4/2000 | Yamamuro ............... 369/47.14 |
| 6,205,099 B1 | * | 3/2001 | Sasaki et al. ............ 369/53.17 |

* cited by examiner

*Primary Examiner*—Nadeem Iqbal
*Assistant Examiner*—Timothy M Bonura
(74) *Attorney, Agent, or Firm*—Kirk A. Cesari

(57) ABSTRACT

A disc drive includes a base and a disc rotatably attached to the base. A controller for a disc drive uses a system for mapping logical block addresses to actual location on a disc drive stores the number of skipped or defective sectors which occur prior to a target cylinder in a cylinder skip table. The system estimates a starting cylinder location for the selected logical block address. After estimating the cylinder location, a number of skipped defective sectors that have occurred prior to a cylinder start is determined. The starting location of the cylinder is slipped by this amount. A target track and associated head is also determined. Information in the track identification field is used to adjust the actual location on the track and to determine if a track seek to another track is needed.

11 Claims, 12 Drawing Sheets

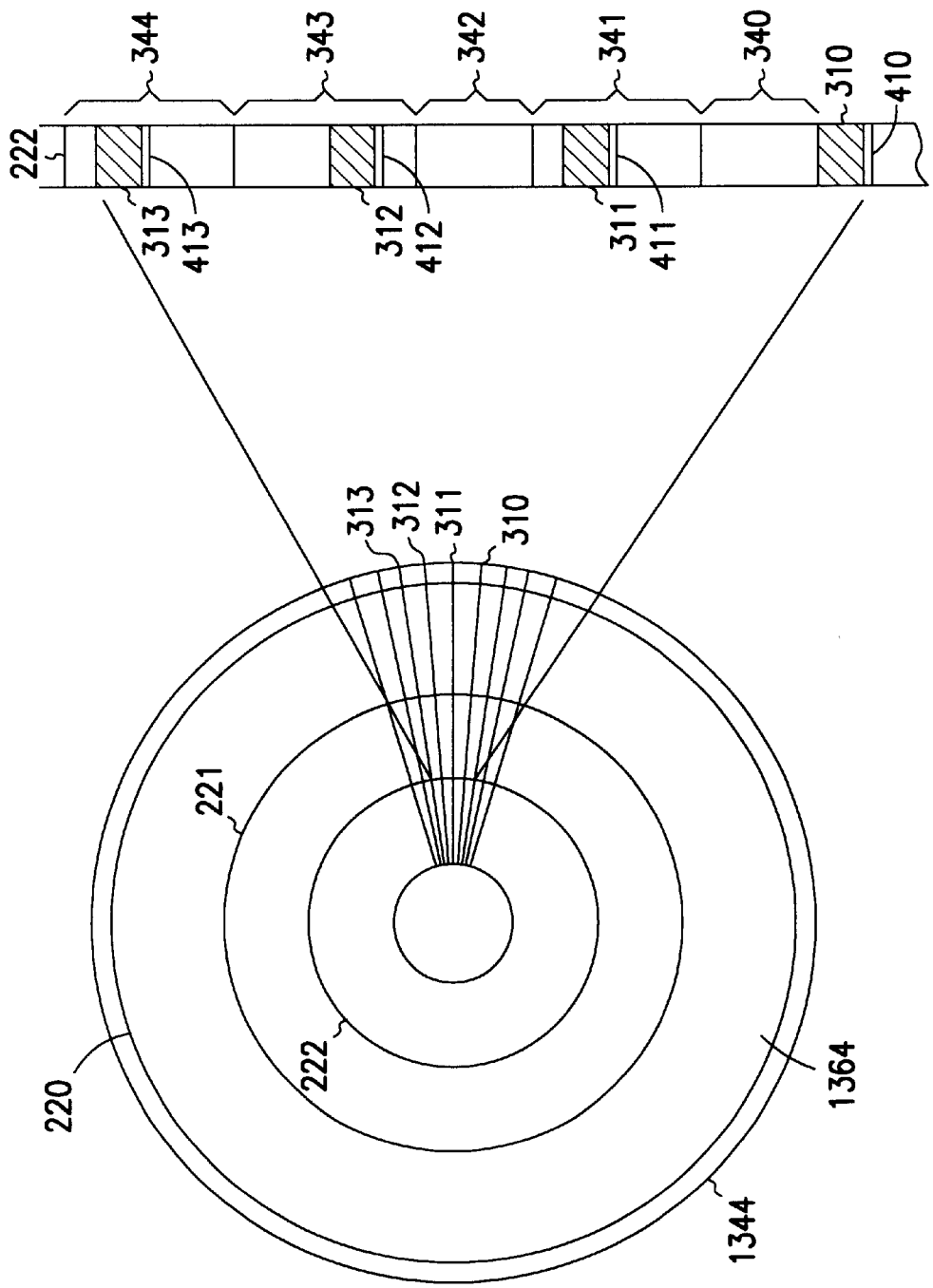

| BYTE | DESCRIPTION | |
|---|---|---|
| 0 | ZAP BYTE 0 | |
| 1 | ZAP BYTE 1 | |
| 2 | ZAP BYTE 2 | |
| 3 | FLAGS (BITS 0 THRU 5) | NUMBER OF SECTORS SLIPPED ON PREVIOUS TRACKS UP TO BEGINNING OF CYLINDER (BITS 8 THRU 9) |
| 4 | NUMBER OF SECTORS SLIPPED ON PREVIOUS TRACKS UP TO BEGINNING OF CYLINDER (BITS 0 THRU 7) | |
| 5 | REPEAT COUNT (BITS 0 THRU 4) | 1ST SKIPPED SECTOR NUMBER (BITS 8 THRU 10) |
| 6 | 1ST SKIPPED SECTOR NUMBER (BITS 0 THRU 7) | |
| 7 | REPEAT COUNT (BITS 0 THRU 4) | 2ND SKIPPED SECTOR NUMBER (BITS 8 THRU 10) |
| 8 | 2ND SKIPPED SECTOR NUMBER (BITS 0 THRU 7) | |
| 9 | REPEAT COUNT (BITS 0 THRU 4) | 3RD SKIPPED SECTOR NUMBER (BITS 8 THRU 10) |
| 10 | 3RD SKIPPED SECTOR NUMBER (BITS 0 THRU 7) | |
| 11 | REPEAT COUNT (BITS 0 THRU 4) | 4TH SKIPPED SECTOR NUMBER (BITS 8 THRU 10) |
| 12 | 4TH SKIPPED SECTOR NUMBER (BITS 0 THRU 7) | |
| 13 | REPEAT COUNT (BITS 0 THRU 4) | 5TH SKIPPED SECTOR NUMBER (BITS 8 THRU 10) |
| 14 | 5TH SKIPPED SECTOR NUMBER (BITS 0 THRU 7) | |
| 15 | REPEAT COUNT (BITS 0 THRU 4) | 6TH SKIPPED SECTOR NUMBER (BITS 8 THRU 10) |
| 16 | 6TH SKIPPED SECTOR NUMBER (BITS 0 THRU 7) | |
| 17 | REPEAT COUNT (BITS 0 THRU 4) | 7TH SKIPPED SECTOR NUMBER (BITS 8 THRU 10) |
| 18 | 7TH SKIPPED SECTOR NUMBER (BITS 0 THRU 7) | |
| 19 | REPEAT COUNT (BITS 0 THRU 4) | 8TH SKIPPED SECTOR NUMBER (BITS 8 THRU 10) |
| 20 | 8TH SKIPPED SECTOR NUMBER (BITS 0 THRU 7) | |
| 21 | HEAD (BITS 0 THRU 2) | CYLINDER (BITS 0 THRU 4) |

FIG. 5

| WORD | | DESCRIPTION |
|---|---|---|
| 610 — 0 | | RdWrCyl |
| 611 — 1 | | RdWrHead |
| 612 — 2 | | RdWrSector |
| 613 — 3 | REPEAT COUNT 1 (BITS 0 THRU 3) | RdWrSkipSector1 (BITS 0 THRU 11) |
| 614 — 4 | REPEAT COUNT 2 (BITS 0 THRU 3) | RdWrSkipSector2 (BITS 0 THRU 11) |
| 615 — 5 | REPEAT COUNT 3 (BITS 0 THRU 3) | RdWrSkipSector3 (BITS 0 THRU 11) |
| 616 — 6 | REPEAT COUNT 4 (BITS 0 THRU 3) | RdWrSkipSector4 (BITS 0 THRU 11) |
| 617 — 7 | REPEAT COUNT 5 (BITS 0 THRU 3) | RdWrSkipSector5 (BITS 0 THRU 11) |
| 618 — 8 | REPEAT COUNT 6 (BITS 0 THRU 3) | RdWrSkipSector6 (BITS 0 THRU 11) |
| 619 — 9 | REPEAT COUNT 7 (BITS 0 THRU 3) | RdWrSkipSector7 (BITS 0 THRU 11) |
| 620 — 10 | REPEAT COUNT 8 (BITS 0 THRU 3) | RdWrSkipSector8 (BITS 0 THRU 11) |
| 621 — 11 | FLAGS (BITS 0 THRU 5) | SkipsFromCylStartToTrackStart (BITS 0 THRU 9) |
| 622 — 12 | | CDRPtr |
| 623 — 13 | | SkewDataSecs |
| 624 — 14 | | SkewSrvoSecs |
| 625 — 15 | | RdWrPhysCyl |
| 626 — 16 | | RdWrPrefetchReadSector |
| 627 — 17 | | RdWrTargetSector |

FIG. 6

CYLINDER CUMULATIVE SKIPS LIST FORMAT 700

| BYTE | DESCRIPTION |
|---|---|
| 0 | NUMBER OF SLIPPED SECTORS PRIOR TO CYLINDER (BITS 8 THRU 15) |
| 1 | NUMBER OF SLIPPED SECTORS PRIOR TO CYLINDER (BITS 0 THRU 7) |

FULL SLIP DEFECT MANAGEMENT SYSTEM USING TRACK IDENTIFICATION

RELATED APPLICATION

This application claims the benefit of U.S. Provisional Application Serial No. 60/116,070, filed Jan. 15, 1999 under 35 U.S.C. 119(e).

FIELD OF THE INVENTION

The present invention relates to the field of mass storage devices. More particularly, this invention relates to an apparatus and method for mapping defective sectors on disc surfaces within a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS" which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

Each track on a disc surface in a disc drive is further divided into a number of short arcs called sectors. The sector typically holds 512 bytes of information representing data. The number of sectors on a track used to be fixed wherever the track was located on the disc surface. Now, the number of sectors held on a track varies depending on the zone which the track is in. Typically, more sectors will be stored on the tracks at the outer diameter which are in the zone toward the outer diameter of the disc.

When a disc is manufactured, there is a possibility that there may be defects on the disc. The defects typically can result in sectors or tracks that have doubtful, dangerous, or damaged magnetic media, which would otherwise put the customer's data at risk. These defects are to be avoided so that information representative of data is not written to a location where the data could be lost. Typically, each disc surface is checked for defects at the time of manufacture. A sector is considered defective if a number of retries must be used to recover the data on the sector. A sector is also considered defective if data written to the sector is not recoverable. Any defective sectors found are kept in memory on a table or map which is unavailable to end users. This table or map is used to reallocate sectors or remap the sectors on the disc drive.

Not all defective sectors are found at the time of manufacture. Defects found after the time of manufacture are sometimes termed as grown defects. There are many sources for grown defective sectors. For example, sometimes a defective sector can be found after an inadvertent contact between the slider. Again, the location of the defective sector or track is stored in memory so that the defective sector is not reused.

There are two basic schemes for handling defects found at the time of manufacture. One scheme is to provide spare sectors either on the track, within the cylinder or at the inner diameter of the disc. Another scheme is called defect slipping. Defect slipping skips over defective sectors and keeps the locations of the defects in a large table. The sectors on the drive are sequentially numbered as logical block addresses. The large table maps each logical block address to a physical location on the disc surface.

In the spare sector scheme, spare sectors could be provided on a track or within a cylinder. A cylinder is a group of tracks from different disc surfaces located at substantially the same radial distance from the center of the disc. If a defective sector was located, the location of the defect was stored in memory and the spare sector on the track or within the cylinder was located and the information representing the data was written to the spare sector. In other instances, the spare sector was not kept on the track or in the cylinder but was kept elsewhere on the surface or surfaces of the disc drive. In this scheme, a pool of spare sectors was kept off track or outside of the cylinder.

In each of these schemes, if a spare is used, the access time of the disc drive suffered. A constant industry goal is to reduce the access time to data on the disc drive. When a spare sector was used, and the spare is located on the track, the disc generally has to undergo an additional revolution to get to the spare sector, read the spare sector and then return to the point after the defective sector. If the spare is within the cylinder, many times an extra revolution was required. If these spares are not used, then the disc drive wastes potentially usable capacity. Placing spare sectors in a pool off track or outside of the cylinder balances capacity and access time. In such a drive, defective sectors are few. However, in the event of encountering a defective sector, the access time is longer than the access times associated with storing the spare within the cylinder or on the track since several seeks must be done to get to the spare sector and then back to the track from which the transducer head is reading or writing. If the spare sectors are kept at a location very far from the tracks being read, the actuator movements associated with the various seeks will increase the access time to the data dramatically.

Another method is referred to as slipping the defects. In essence, when a defective sector is found, the defective sector is skipped and the next sector available is the next sector. This cuts down on the seeks necessary to obtain the information. One of the problems associated with this method is that it requires a large buffer for storing tables necessary to map the logical block address to the actual location. The actual location is sometimes referred to as the cylinder-head-sector (CHS) address. For example, in a disc drive that has a capacity of 40 gigabytes (GB), if 1 spare sector is allocated per megabyte (MB) then there are 40,000 spare sectors allocated. Storing the locations of slipped sectors requires approximately 8 bytes of information. This requires a buffer having a size of 312 kilobytes (KB) which is determined by multiplying (40,000 spare sectors)×(8 bytes per sector). Buffer storage is expensive and therefore there is a need to keep the amount of storage to a minimum. Furthermore, buffer storage is typically used on operations to speed access times. For example, buffer storage is used to temporarily store tracks or sectors near sectors being read since many times the next request for data comes from a nearby sector. If data is stored within the buffer, the data can be accessed much more quickly from the buffer thereby dramatically improving the access time to the data. Thus, freeing up buffer memory is also advantageous since more of the buffer memory can be used to store adjacent data or do some other operation for speeding up the disc drive.

What is needed is a method and apparatus for dealing with defective sectors that reduces access times and also reduces the amount of buffer needed to store tables necessary for mapping logical block addresses to the actual location on the disc or discs of the disc drive. What is also needed is method and apparatus that accurately remaps the logical block addresses to the physical location on the disc drive.

SUMMARY OF THE INVENTION

A method for mapping logical block addresses to actual location on a disc drive includes dividing a logical block address by a number of sectors within a cylinder to estimate a starting cylinder location for the selected logical block address, and determining a number of skipped defective sectors that have occurred prior to a cylinder start. The method also includes adding the number of defective sectors skipped prior to the cylinder start to a beginning sector location of the cylinder. The starting cylinder also may be adjusted by a number of cylinders skipped prior to the estimated start cylinder. The number of cylinders skipped is stored in a cylinder skip table. The cylinder skip table stores the number of cylinders skipped prior to a cylinder.

Once the cylinder is determined, the head to seek to is estimated by subtracting the number of sectors skipped prior to the location of the cylinder start and a number of sectors in the cylinders prior to the cylinder start from the logical block address to determine a quantity. The quantity is divided by a number of sectors within a track associated with the cylinder to estimate a track location for the logical block address. A seek is performed to the head associated with the estimated track location. After the track location and head associated with the estimated track location is seeked to, the number of sectors skipped within the cylinder prior to the estimated track location is determined. The number of sectors skipped within the cylinder prior to the estimated track is added to the beginning sector within the track to determine the physical location of the logical block address. The number of sectors skipped within the cylinder prior to the estimated track is determined by storing the number of sectors skipped within the cylinder prior to the beginning of the track in a track identification field at the track. Reading the track identification field produces the number of sectors skipped. If the number of sectors that must be added to a beginning track location to adjust for skipped sectors pushes the logical block address to a physical address associated with another track then a seek to another track within the cylinder is performed to locate the logical block address. The number of skipped sectors on a track and a location of the sectors skipped on a particular track may also be stored in a track identification field on a track.

Using a cylinder skip table and storing information regarding the number of sectors skipped within the cylinder prior to the track start and also regarding the location and number of sectors skipped on the track, allows for mapping logical block addresses to actual physical locations on the disc with a buffer having a much reduced size than previously needed to store tables necessary for mapping logical block addresses to the actual location on the disc or discs of the disc drive.

A disc within a disc drive has a plurality of tracks with a track identification field associated with each of the plurality of tracks. The track identification field includes information regarding the number and position of defective sectors on the track. The track identification field may also include information regarding the number of defective sectors skipped within a cylinder prior to the start of the track.

Advantageously, the disc drive which uses the above inventions needs a buffer memory which is smaller than used in other remapping schemes. The reduced buffer memory results in a less costly disc drive or frees buffer memory for other uses.

BRIEF DESCRIPTION OF THE DRAWINGS

FIG. 3 is a schematic representation of one of the tracks from the cylinder from the disc pack shown in FIG. 2.

FIG. 4 is a schematic representation of a portion of the track shown in FIG. 3. which includes a track identification field, sectors for storing information representative of data, and servo information.

FIG. 5 shows the format of the track identification field shown on the disc in FIG. 4.

FIG. 6 shows the data structure used by the controller for the target track.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
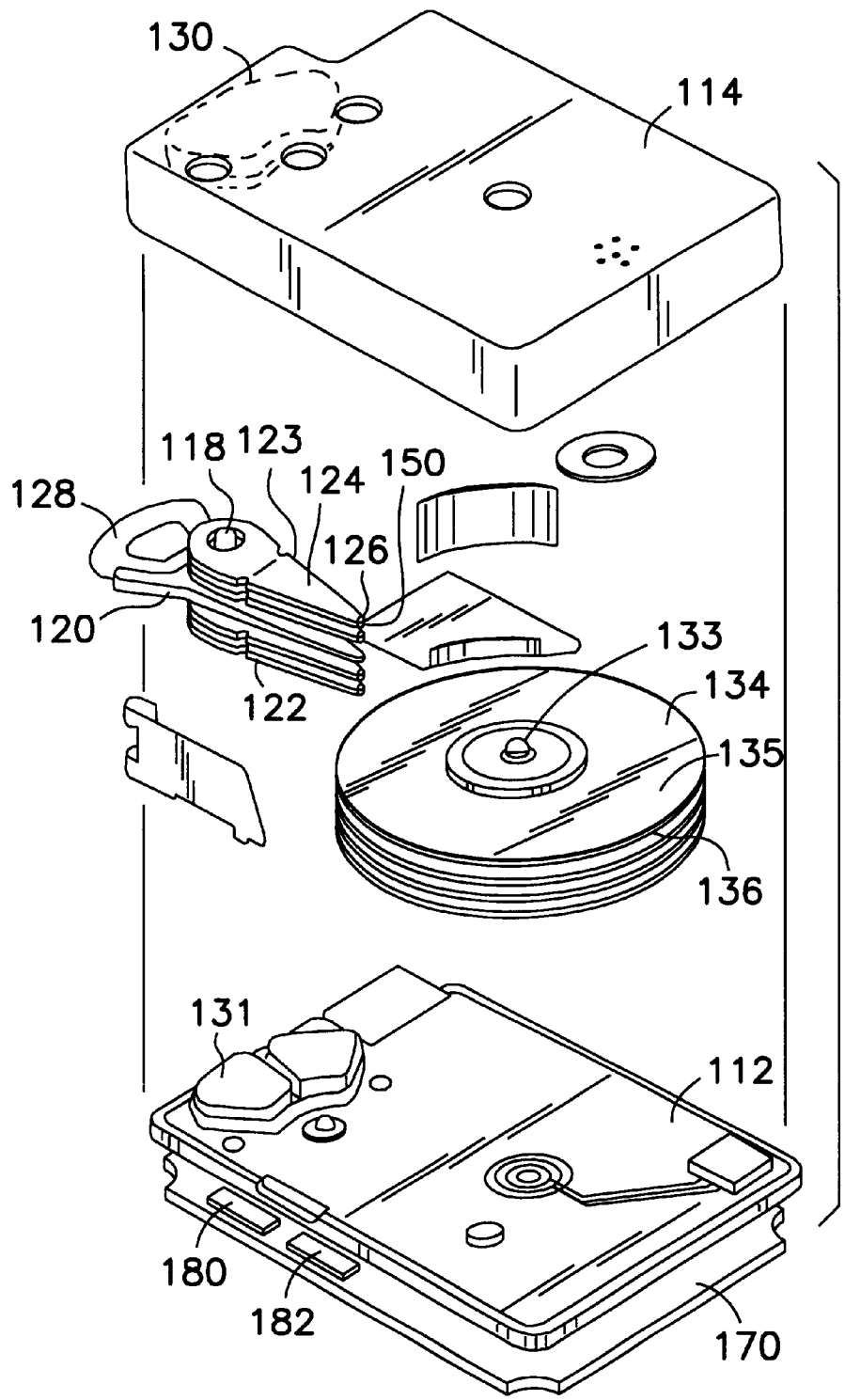
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. Each of the discs 134 has a first recording surface 135 and a second recording surface 136. Only one disc 134 is numbered for the sake of clarity. In other disc drives a single disc or a different number of discs may be attached to the hub.

The invention described herein is equally applicable to disc drives which have a plurality of discs as well as disc drives that have a single disc. The invention described herein is also equally applicable to disc drives with spindle motors which are within the hub 133 or under the hub. The disc drive also includes a printed circuit card 170 which is attached to the base 112 of the disc drive 100. The printed circuit card 170 includes a controller 180 and random access memory 182 which the controlled accesses to control various aspects of the disc drive. The aspect of the disc drive controlled of interest is the control of the interface between a host computer and the disc drive and more specifically, the control of mapping logical block addresses to physical sector locations on a particular disc 134.

Figure 2:
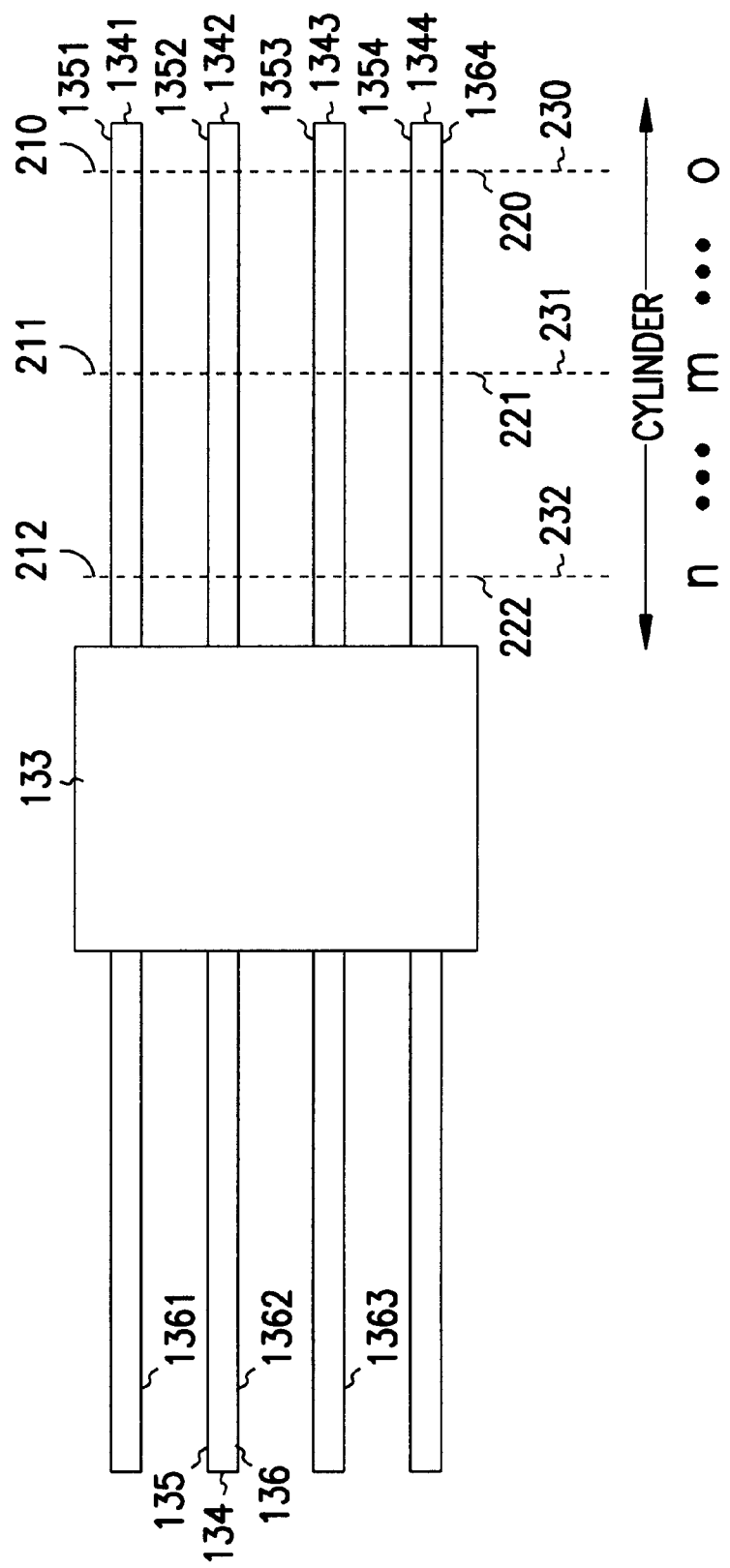
FIG. 2 is a cutaway schematic representation of the discs of a disc drive showing a set of tracks within a cylinder.

FIG. 2 is a cutaway schematic representation of the discs 134 of the disc drive 100. As shown in FIG. 2, each of the discs 134 has a first recording surface 135 and a second recording surface 136. Each of the discs is also attached to the spindle hub 133. In FIG. 2, each of the discs 134 is individually numbered as 1341, 1342, 1343, and 1344. Each disc also has a first recording surface 1351, 1352, 1353, 1354 and a second recording surface 1361, 1362, 1363, 1364. Information representing data is stored along a track on a recording surface of a disc. As shown in FIG. 2, there are three tracks 210, 211, and 212 on recording surface 1351 of disc 1341. The tracks occur on each of the disc surfaces 1351, 1352, 1353, 1354, 1361, 1362, 1363, 1364 and are shown as tick marks on each of the disc surfaces. Similar tracks are shown as tracks 220, 221 and 222 on surface 1364 of disc 1344. Generally, modern-day disc drives have many more than three tracks on a disc. For example, certain disc drives may have more than 4,000 tracks on a 3.5 inch disc platter. The tracks shown 210, 211, 212, 220, 221 and 222 show sets of tracks which are at the outer diameter 210, 220 and a set of tracks that represent tracks at the inner diameter 212 and 222, and a set of tracks at an intermediate diameter 211 and 221.

FIG. 2 illustrates that each of the discs 1341, 1342, 1343 and 1344 have a first and a second recording surface. Each of the recording surfaces has a set of tracks thereon. Therefore, tracks are found on a particular recording surface. FIG. 2 also illustrates the concept of cylinders. A cylinder is a set of tracks that are at substantially the same radial distance away from the center of a set of discs. For example, tracks 212 and 222 and all the tracks in between tracks 212 and 222 form a cylinder 232 at the inner diameter of the disc pack. All the tracks at the same radial distance as tracks 211 and 221 on all the recording surfaces of the discs 1341, 1342, 1343, 1344 form a cylinder 231 at an intermediate diameter with respect to the disc pack. Finally, all the tracks between tracks 210 and 220 form a third cylinder 230 at the outer diameter of the disc pack. Thus, cylinders are a grouping of tracks across two or more recording surfaces. It should be noted that the concept of cylinders is equally applicable to a single disc type disc drive as well as to a multi-disc disc drive. It should also be noted that the number of cylinders will be generally equal to the number of tracks on the surface of the discs in the disc drive. In FIG. 2, the cylinder at the outer diameter is cylinder 0, and the cylinder at the inner diameter is cylinder N, which also carries a reference numeral 232. It should be noted that generally the tracks are invisible to the naked eye when viewing a disc, and that the markings shown in FIGS. 2, 3 and 4 are for the sake of illustration.

FIG. 3 is a schematic representation of one of the discs 1344 of the disc pack shown in FIG. 2. Specifically, recording surface 1364 of disc 1344 is shown in FIG. 3 as are tracks 220, 221 and 222. Disc surface 1364 includes embedded servo information which appear as lines 310, 311, 312, and 313 in FIG. 3. The lines 310, 311, 312 and 313 are actually wedges of servo information used to locate the transducer or one of the transducers 150 in a slider over a selected track on a disc. The servo information 310, 311, 312 and 313 also may include other information such as a track ID or track identification portion which is used to identify the track.

FIG. 4 is a schematic representation of a portion of the track 222 shown in FIG. 3. The portion of the track 222 shown in FIG. 4 represents a very small arcuate portion. The arc is so small that, for the sake of simplicity, portions of the track 222 that is shown is shown as though it were along a line. Track 222 includes the servo information 310, 311, 312, 313 as well as several sectors 340, 341, 342, 343, 344 which are used to store information representing data on the track. The servo information 310, 311, 312, 313 is equally spaced along the track portion 222. Sectors are generally, 512 bytes long and may be at the beginning or end of a particular piece of servo information or may be split by servo information. For example, sectors 340 and 342 are whole sectors which are not cut or split by servo information. Meanwhile, sector 341 is cut by servo wedge 311, sector 343 is cut by servo wedge 312, and sector 344 is cut by servo wedge 313. The servo portions or wedges 310, 311, 312, 313 each include locational information which is used to center a transducer over the centerline of the track 222. In addition, each bit of servo information includes a track identification field which includes information to identify the track as well as other information about the track. In this particular embodiment, the even servo wedges 310 and 312 store a type of servo information for a read head while the odd servo wedges 311 and 313 store servo information in the track identification field for the write element of the transducer. The track identification fields are shown as reference numerals 410, 411, 412, 413.

FIG. 5 shows the format of a track identification field 410 from FIG. 4. Bytes 3 and 4 include the number of sectors slipped on previous tracks up to the beginning of the cylinder, as shown by reference numeral 510. Bytes 5 and 6 include the location of a first skipped sector on the track, as depicted by reference numeral 520. The skipped sector and its location are determined by the sector number. The second skipped sector number is depicted by byte 7 and 8, as depicted by reference numeral 521. The third skipped sector number is given by bytes 9 and 10, as depicted by reference numeral 522. The fourth skipped sector number is shown by bytes 11 and 12, as depicted by reference numeral 523. The fifth skipped sector number is held by bytes 14 and 15, as depicted by reference numeral 523. The sixth skipped sector number is shown by bytes 15 and 16, as depicted by reference numeral 525. The seventh skipped sector number is depicted by bytes 17 and 18, as shown by reference numeral 526. And the eighth skipped sector number is shown by bytes 19 and 20, as depicted by reference numeral 527. Byte 21 includes the cylinder number, as depicted by 540 as well as the head number, as depicted by reference numeral 530. The head number within a cylinder indicates which of the tracks within a cylinder, or more specifically, which one of the surfaces within the cylinder is being read or written to. Again, a cylinder is a group of tracks and a head or transducer 150 is associated with a particular surface, such as 1351, 1352, 1353, 1354, 1361, 1362, 1363 or 1364. In summary, the track identification field 410 includes the number of sectors that were slipped or skipped on previous tracks from the cylinder start to the start of the particular track, as depicted by reference numeral 510, as well as the location of skipped sectors on the track, such as track 222.

FIG. 6 shows the data structure used by the controller 180 for a particular target track. The data structure includes a series of words that are used to describe the data that will be used in making various calculations. Word 0 is the read/write cylinder as depicted by 610, word 1 relates to the read/write head as depicted by reference numeral 611, and word 2 relates to the read/write sector as depicted by reference numeral 612. Words 3–10 each include a repeat count as well as the location of a read/write skipped sector, as depicted by reference numerals 613, 614, 615, 616, 617, 618, 619. Word 11 includes several flag bits as well as the number of sector skips from the cylinder start to the track start, as depicted by reference numeral 620. Word 12 is information related to the consistent density recording (CDR) pointer. Word 13 includes skew information on the data sectors, as depicted by reference numeral 622, and word 14 includes skew information for the servo sectors as depicted by reference numeral 623. Word 15 includes information on the read/write physical cylinder, as depicted by reference numeral 625. Word 16 includes read/write prefetch read sector as depicted by reference number 626, and word 17 is related to the read/write target sector, as depicted by reference numeral 627.

Figures 7, 8:
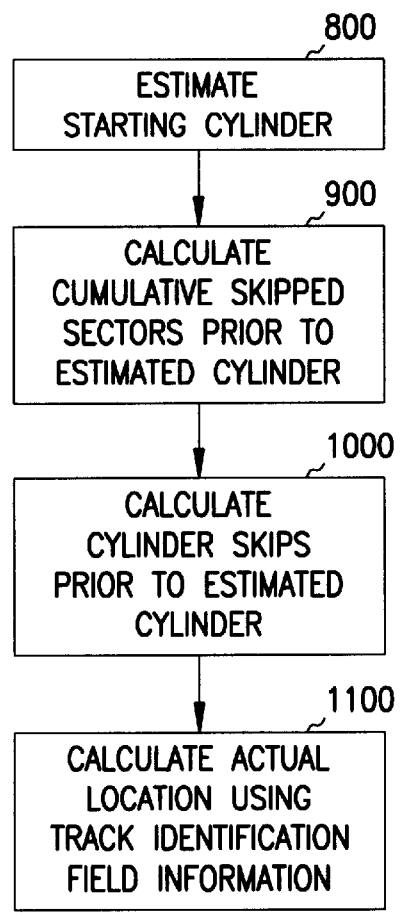
FIG. 7 shows the data structure for the cylinder skip table used by the controller for the target track.
FIG. 8 is a flow chart overview of mapping a logical block address to a physical location on the disc drive.

The controller 180 also uses a cylinder skip table 700. For each cylinder 0 . . . M . . . N on the disc drive 100, two bytes of data are stored depicting the number of slip sectors prior to the cylinder. The cylinder cumulative skip format is shown in FIG. 7. Byte 0 and 1 are used to show the cumulative number of slipped sectors prior to a cylinder.

FIG. 8 is a flow chart overview of the process of mapping a logical block address to a physical location on the disc drive 100. As shown in FIG. 8, the first step 800 is to estimate the starting cylinder for the logical block address. Simply put, the number of the logical block address is divided by the number of sectors per cylinder. The whole number that results is generally the number of the starting cylinder. Since the cylinders generally are numbered from 0–N.

When zone bit recording is used on a disc drive 100, there are bands of tracks or bands of cylinders in which each cylinder has a different number of sectors. In this case, a cumulative number of sectors in each cylinder will first be subtracted from the logical block address before the division is performed using the number of sectors per cylinder within the zone as the denominator to estimate the starting cylinder. Once the starting cylinder is estimated, the first calculation is done to determine the cumulative number of skipped sectors prior to the estimated cylinder, as depicted by reference numeral 900. Another step, as depicted by reference numeral 1000, is to calculate the number of skipped cylinders prior to the estimated cylinder. Steps 900 and 1000 are used to adjust the starting cylinder as well as to adjust the starting point within the cylinder. In other words, step 1000 adjusts the actual physical cylinder while step 900 determines the starting place within the cylinder and may even adjust for an added cylinder where the logical block address will be found as in its actual physical location. Finally, once the actual cylinder is found by adjusting the estimated cylinder using steps 900 and 1000, a third calculation is performed to calculate the actual location using track identification field information 410, as depicted by reference numeral 1100.

Figure 9:
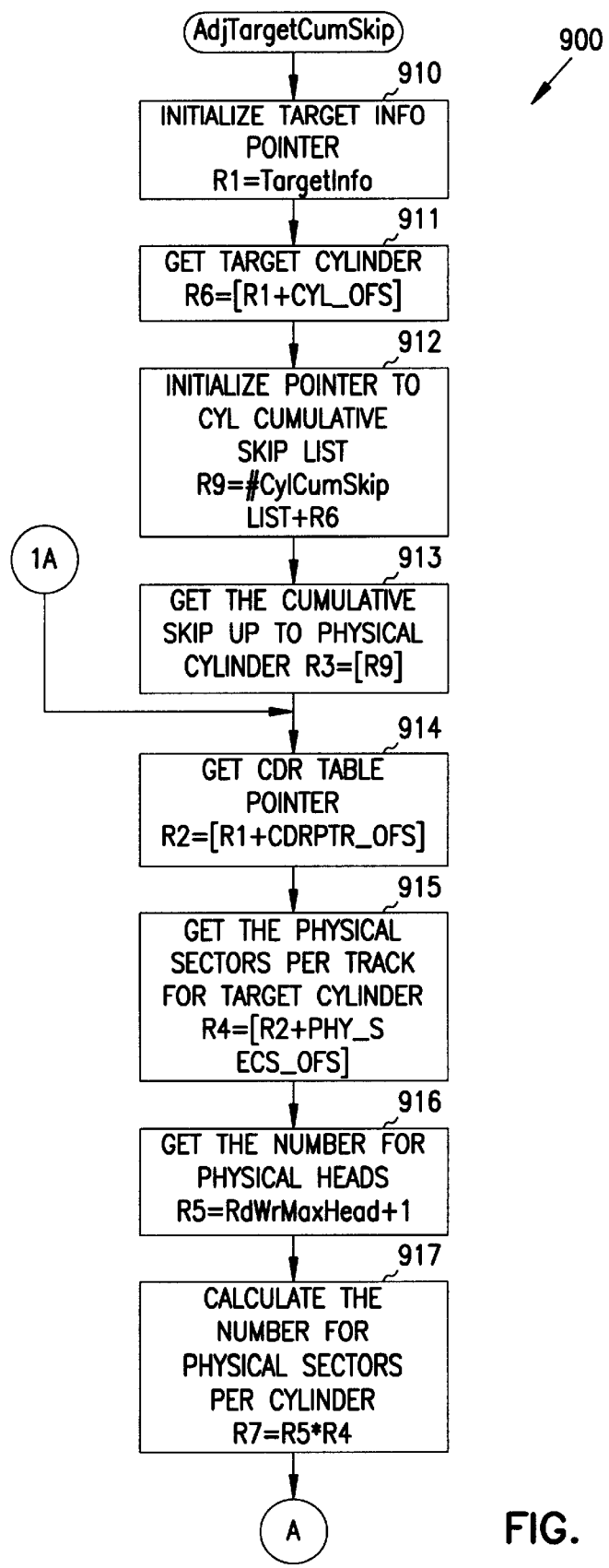
FIGS. 9–11 are flow charts showing how the cumulative skips are calculated.
Figure 10:
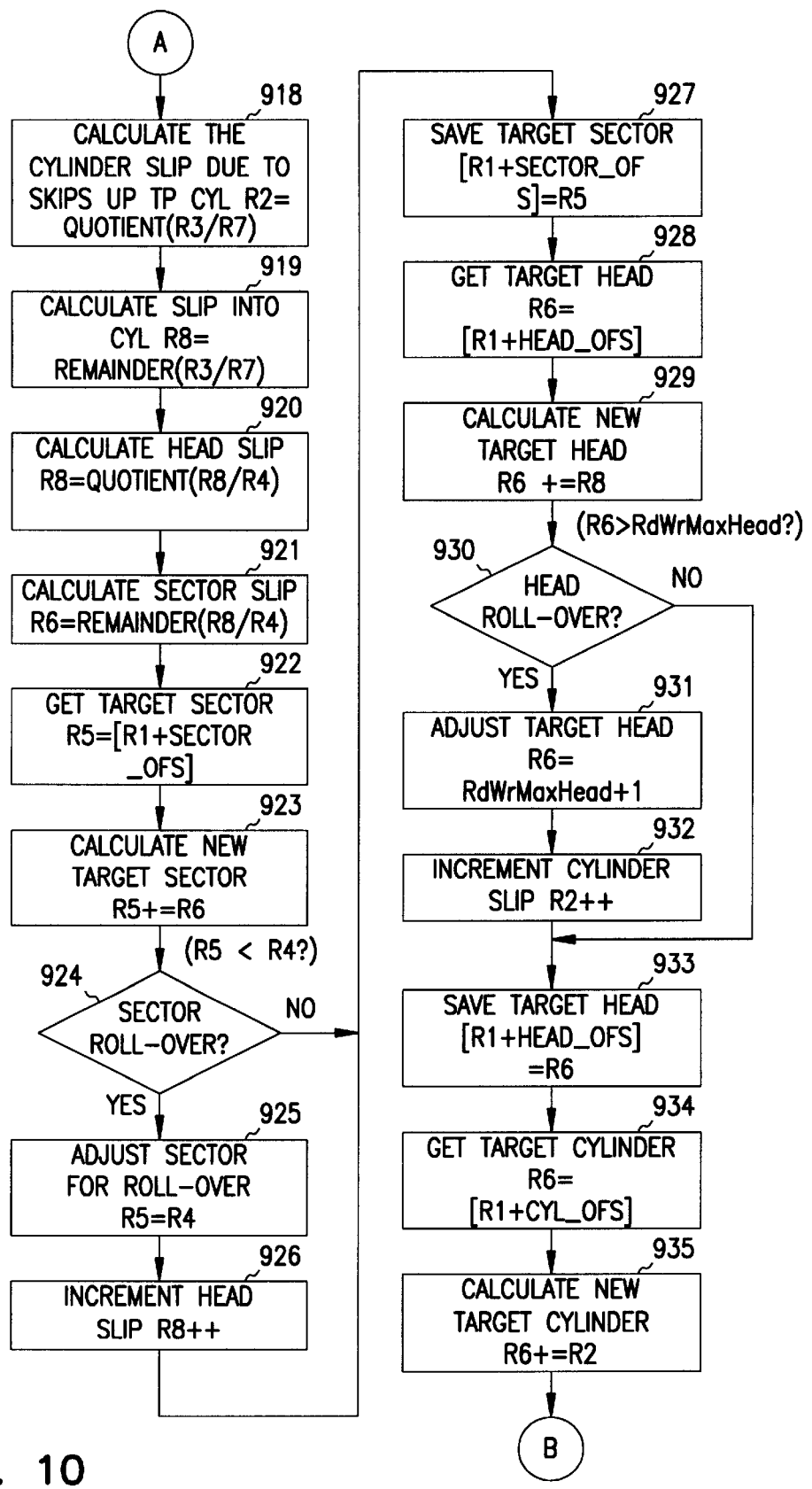
Figure 11:
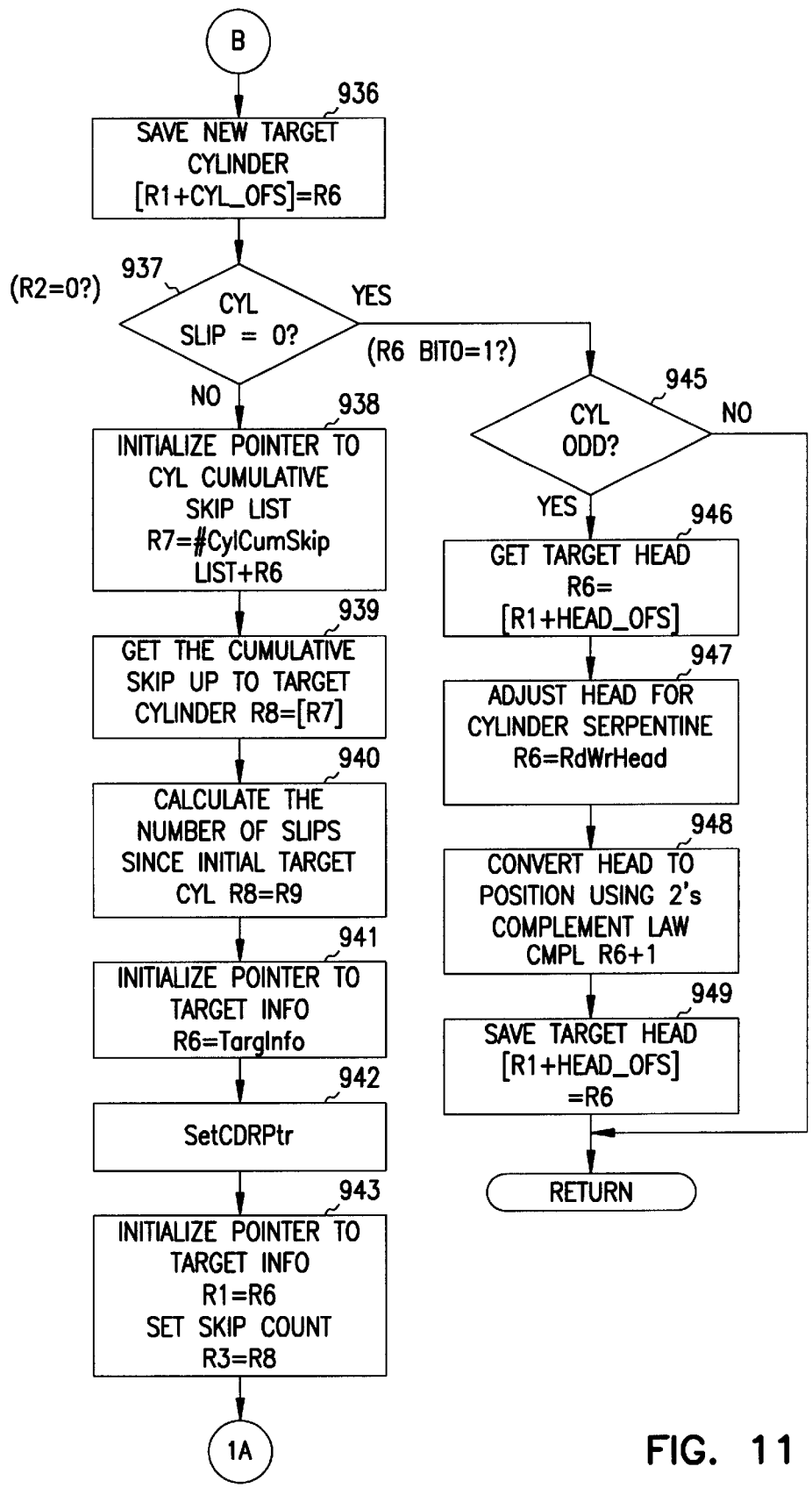

FIGS. 9–11 are flow charts which further detail step 900 wherein the cumulative skipped sectors are calculated. FIG. 9 includes steps 910 to 917. FIG. 10 includes steps 918 to 935. FIG. 11 includes steps 936 to 949. The goal is to adjust the target cylinder for cumulative skipped sectors. The initial target cylinder is synonymous with the estimated starting cylinder which is found as discussed in the above paragraph with reference to estimating the starting cylinder 800 in the process. As depicted by step 910, the first step is to initialize the target info point or information pointer. As depicted by reference numeral 911, the target cylinder R6 is obtained. Once the target cylinder is obtained, the pointer is initialized to the cylinder cumulative skip list 700, as depicted by step 912. The next step 913 is to get the cumulative skip sectors up to the physical sector from the cumulative skipped sector list 700. Next, as depicted by reference numeral 914, the CDR table pointer is obtained. Once the physical cylinder is obtained, the number of the physical sectors per track for the target cylinder is obtained from the CDR table and is set forth as quantity R4 (register location associated with a microprocessor), as depicted by step 915. Step 916 is to get the number of physical heads for the cylinder which equals R5 (register location associated with a microprocessor), as depicted by step 916. As depicted by 917, the number of physical sectors per cylinder is determined by taking the number of physical sectors per track R4 (register location associated with a microprocessor) times the number of heads R5 (register location associated with a microprocessor) to yield the product R7 (register location associated with a microprocessor) which is the number for the physical sectors per cylinder.

Once the number of physical sectors per cylinder is calculated, the number R7 (register location associated with a microprocessor) is used to calculate the number of cylinder slips due to skips up to the cylinder which is the cumulative number of sectors skipped divided by the number of sectors within a cylinder, as depicted by step 918. The remainder of the quotient R3 (register location associated with a microprocessor) divided by R7 (register location associated with a microprocessor) is the number of sectors that are slipped within a particular physical cylinder, as depicted by step 919. In other words, the remainder is the number of sectors that must be skipped within the cylinder before the first logical block address that would be associated with the cylinder if no cylinder defects were found. The next step is to calculate the head slip which equals the remainder or number of sectors that will occur at the beginning of the cylinder due to slipped sectors or skipped sectors divided by the number of physical sectors per track, as depicted by step 920. The next step is to calculate how many sectors slip within the particular track by again looking at the remainder or the quantity calculated in step 920. Calculating the sector slip is depicted by reference numeral 921. Step 922 is to obtain the target sector, and step 923 is to calculate the new target sector. Based on the quantities as set above, the next step is to make a decision as to whether there is a sector rollover, as depicted by decision box 924. If there is a sector rollover, the sector is adjusted for the rollover, as depicted by step 925 and the head slip, or changing to a new head, is implemented, as depicted by step 926. The next step is to save the target sector as depicted by step 927. In the event that there is no sector rollover, steps 925 and 926 are skipped and step 927 is implemented. The next step is to get the target head as depicted by reference numeral 928 and to calculate the new target head, as depicted by step 929.

If the calculations indicate that there was to be a head rollover, referenced as decision box 930, the target head is adjusted as depicted by 931 and the slip within the cylinder is incremented, as depicted by 932. These two steps, 931 and 932, are skipped if there is no head rollover. The next step is to save the target head as depicted by reference numeral 933, to get the target cylinder as depicted by step 934 and to calculate the new target cylinder, as depicted by step 936. Next is a decision tree to determine if the cylinder slip not equal to 0, as depicted by decision box 937. If the cylinder slip equals 0, a pointer is initialized to the cylinder cumulative skip list, as depicted by step 938, and to get the cumulative skip up to the target cylinder, as depicted by step 939, and to calculate the number of slips since the initial target cylinder as depicted by 940. The next step is to initialize the pointer to the target info, as depicted by step 941 and to set the CDR pointer 942 and to initialize the pointer to the target info and set the skip count as depicted by step 943. If the cylinder slip is equal to 0, and the cylinder is not odd as depicted by decision box 945, the first calculation is ended. If the cylinder is odd, the target head is first obtained, as depicted by step 946 and the head is adjusted for the serpentine motion within the cylinder, as depicted by step 947. The head is then converted to a positive using a twos-complement law, as depicted by step 948 and the target head is saved, as depicted by step 949, and then the first calculation, or set of calculations 900, is complete.

Figure 12:
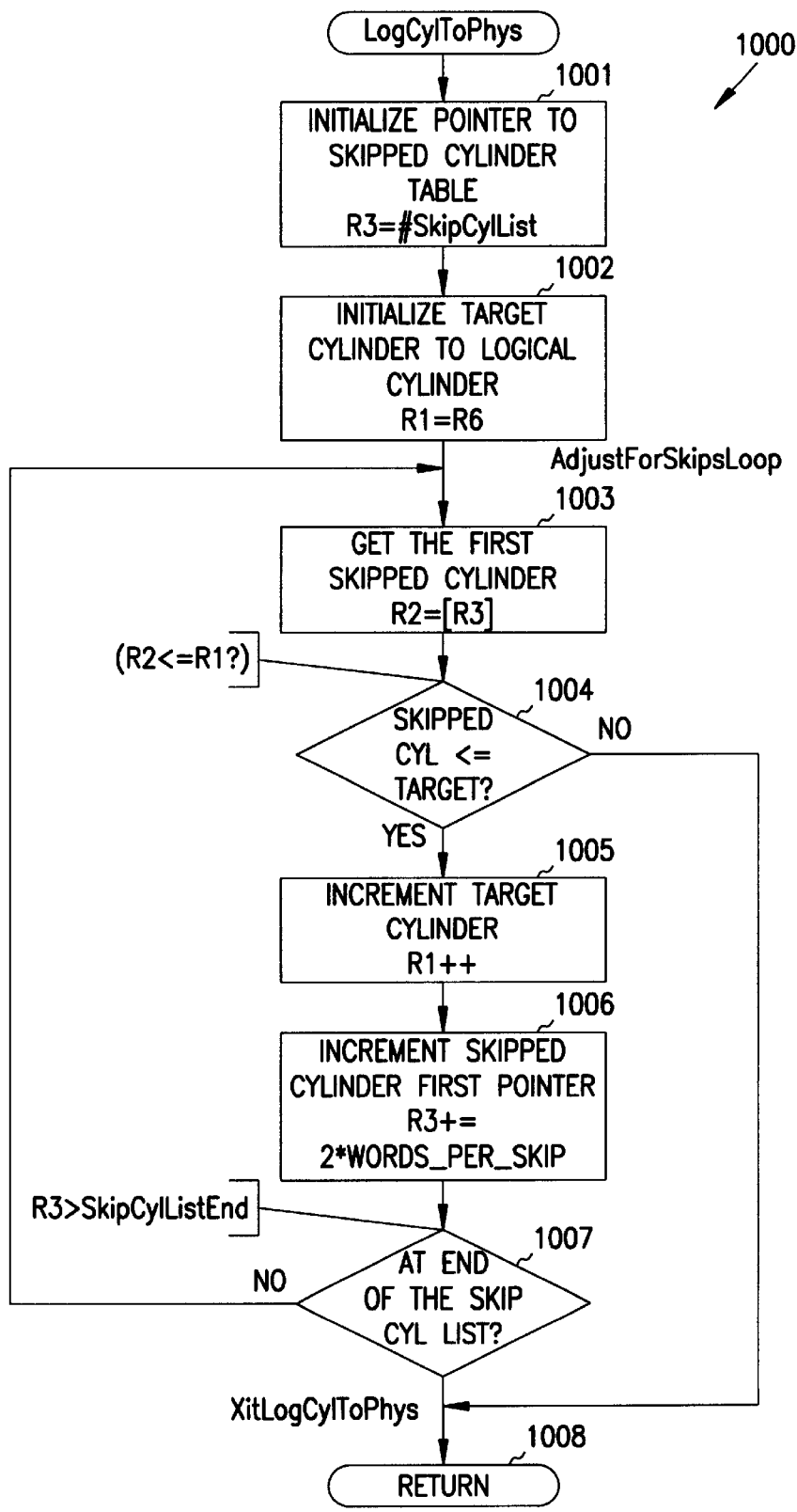
FIG. 12 is a flow chart showing how the cylinder skips are calculated.

FIG. 12 is a flow diagram for calculating the cylinder skips prior to the estimated start cylinder which is used in the first calculation 900. In other words, the main point of the second calculation is to map the logical cylinder to a physical cylinder within the disc drive. Initially, the pointer is initialized to the skipped cylinder table, as depicted by reference numeral 1001. And the target cylinder to logical cylinder is initialized as depicted by step 1002. The first skipped cylinder is obtained, as depicted by step 1003, and then a compare operation is performed to determine if the skipped cylinder obtained from the skipped cylinder table is not less than the target cylinder, then the process ends since there are no skipped cylinders. If the skipped cylinder is less than the target cylinder, then the target cylinder is incremented by one as depicted by step 1005, and the skipped cylinder list pointer is incremented to the next skipped cylinder, as depicted by step 1006. A decision is then made as to whether the current skipped cylinder is also the last skipped cylinder on the list. If it is not, the process is repeated and steps 1003, 1004, 1005, 1006 and 1007 are again repeated. If yes, at the end of the skipped cylinder list, the process is complete.

The first two calculations depicted by process 900 and 1000 are to determine the number of cylinders skipped as well as the number of sectors skipped before the start of the target cylinder. Another way of looking at the first two steps is that an estimate is first determined for a target cylinder and the first two calculations adjust the target cylinder based on skipped cylinders and based on skipped sectors. The next step in the process is to calculate the actual location using information found in the track identification field, as depicted by step 1100 in FIG. 8 and further detailed in FIG. 13.

Figure 13:
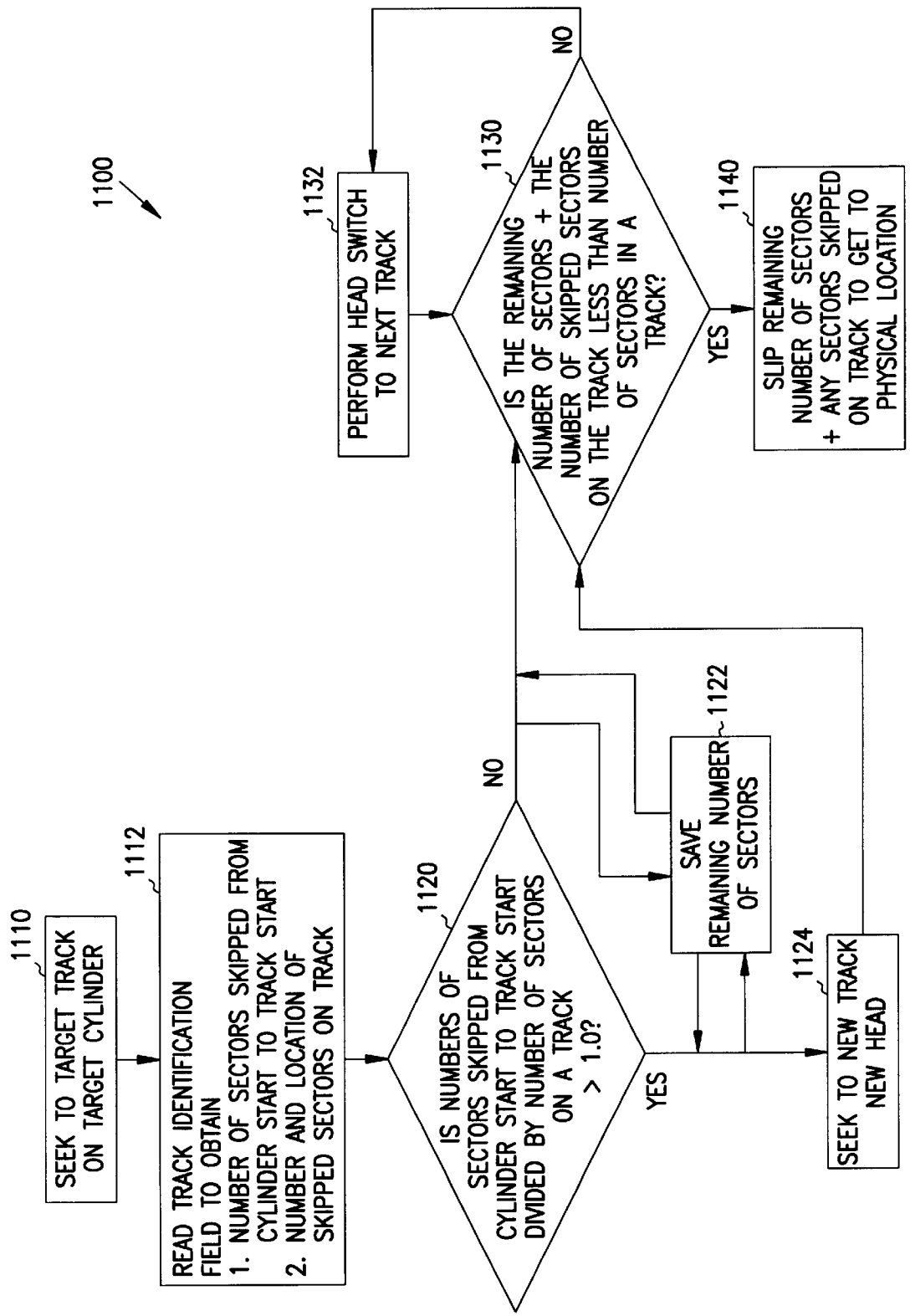
FIG. 13 is a flow chart showing how the physical location on the track is determined from information found in the track identification field on the disk.

FIG. 13 is a flow chart in which the physical location of a sector, such as sector 342, is determined from information found in the track identification field such as sector 311 on a disc surface such as 1364. After making the first two calculations, the first step is to seek to the target track on the target cylinder determined by the first two calculations, as depicted by reference numeral 111 0. The track identification field 410 is read to obtain first the number of sectors skipped from cylinder start to the track start and the number and location of skipped sectors on the particular track, as depicted by reference numeral 1112. Next, it is determined if the number of sectors skipped from the cylinder start to the track start divided by the number of sectors on a track within the cylinder is greater than 1. If it is greater than 1, the number of remaining sectors from the division operation is saved, as depicted by reference numeral 1122, and a seek to a new track and new head, as depicted by reference numeral 1124.

It should be noted that seeking to the new track and new head is done to the whole integer number of the divide operation in step 1120. In other words, if the number of sectors skip from cylinder start to the track start divided by a number of sectors on a track is 1.1, then a head switch to the next head or N-track will be performed and if the number of sectors skipped from cylinder start to track start divided by the number of sectors on the track is more than 2, a head switch two tracks away will be performed. The remaining number of sectors is then recalled from storage and added to the number of skipped sectors on the track. The next part of the process is to determine if the number of remaining sectors plus the number of skipped sectors on the track is less than the total number of sectors on the track, as depicted by decision box 1130. If it is less than the total number of sectors on the track, the number of sectors plus any sector skipped on the track are slipped to get to a physical track location, thereby completing the mapping of a logical address to a physical location.

Now returning back to step 1120, if the number of sectors skipped from the cylinder start to the track start divided by the number of sectors on a track is not greater than 1, then the step 1124 is bypassed. If the remaining number of sectors plus the number of skipped sectors on the track is not less than the number of sectors on the track, then a head switch to the next available track is performed, as depicted by step 1132. This should place the read or write head on the proper track where the remaining number of sectors plus the number of skipped sectors on the track are less than the number of sectors in the track, as depicted by step 1130 or decision box 1130, so that the remaining number of sectors plus any number of sectors skipped on the track can be slipped to yield the final track location, as depicted by step 1140.

Advantageously, the disc drive which uses the above inventions has additional capacity. The disc for the disc drive allows additional information to be stored on the disc drive without an appreciable rise in the error rate. The disc is formatted to allow for additional data to be stored on the disc. The tracks per inch or track density of the groups of tracks on the disc of the disc drive serves to limit the amount of read and write errors that occur. As a result, the access times to information including customer data is unaffected by increased track density since the track density is selected so that the percentage of track misregistrations stays within a selected range. The result is that the disc in the disc drive is formatted so as not to allow the occurrence of track misregistration to climb over a selected percentage. Still a further advantage is that the method and apparatus used to format the disc in the disc drive do not deviate appreciably from current technologies. Therefore, the above inventions can be accommodated using manufacturing techniques close to current manufacturing techniques.

Figure 14:
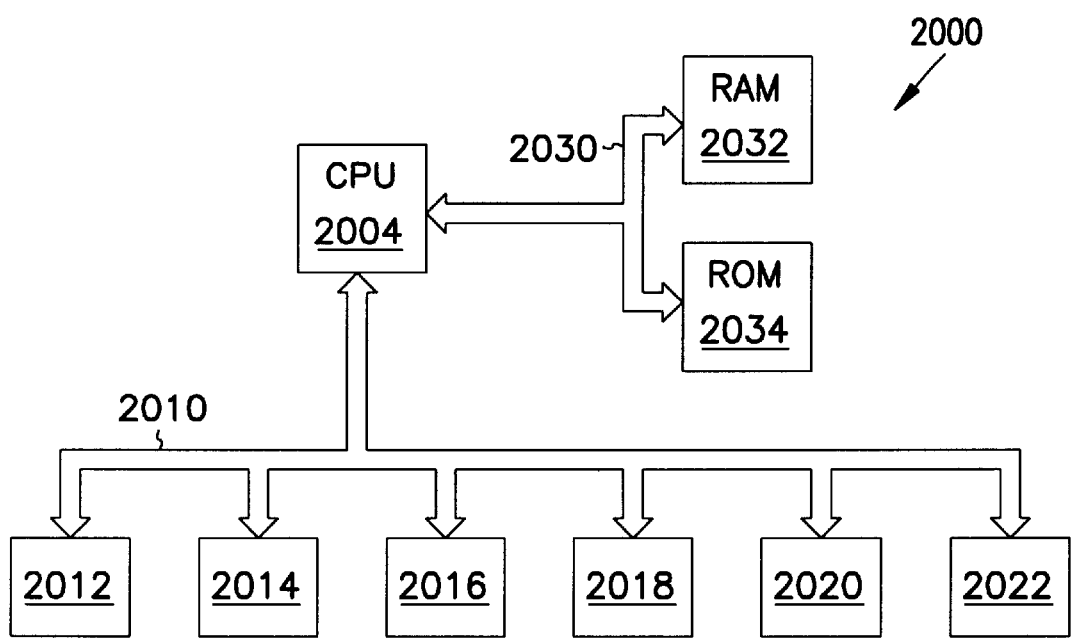
FIG. 14 is a schematic view of a computer system.

FIG. 14 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a method for mapping logical block addresses to actual location on a disc drive includes dividing a logical block address by a number of sectors within a cylinder 230, 231, 232 to estimate a starting cylinder location for the selected logical block address, and determining a number of skipped defective sectors that have occurred prior to a cylinder start 913. The method also includes adding the number of defective sectors skipped prior to the cylinder start to a beginning sector location of the cylinder 230, 231, 232. The starting cylinder 230, 231, 232 also may be adjusted by a number of cylinders skipped prior to the estimated start cylinder 230, 231, 232. To determine the number of cylinders skipped, a cylinder skip table is referred to. The cylinder skip table stores the number of cylinders skipped prior to a cylinder 919. Once the cylinder 230, 231, 232 is determined, the head 150 to seek to is estimated by subtracting the number of sectors skipped prior to the location of the cylinder start 919 and a number of sectors in the cylinders prior to the cylinder 230, 231, 232 start 913 from the logical block address to determine a quantity. The quantity is divided by a number of sectors within a track associated with the cylinder 230, 231, 232 to estimate a track location for the logical block address 923. A seek is performed to the head 150 associated with the estimated track location.

After the track location and head 150 associated with the estimated track location is seeked to, the number of sectors skipped within the cylinder 230, 231, 232 prior to the estimated track location is determined. The number of sectors skipped within the cylinder 230, 231, 232 prior to the estimated track is added to the beginning sector within the track to determine the physical location of the logical block address. The number of sectors skipped within the cylinder 230, 231, 232 prior to the estimated track 1112 is determined by storing the number of sectors skipped within the cylinder 230, 231, 232 prior to the beginning of the track in a track identification field 410 at the track. Reading the track identification field 410 produces the number of sectors skipped. If the number of sectors that must be added to a beginning track location to adjust for skipped sectors pushes the logical block address to a physical address associated with another track 1120, 1130 then a seek 1124, 1132 to another track within the cylinder 230, 231, 232 is performed to locate the logical block address. The method includes storing a number of sectors skipped on a particular track 520, 521, 522, 523, 524, 525, 526, 527, and adding the number of sectors on the track that have been skipped to the number of sectors skipped prior to the cylinder start 510. The number of sectors skipped prior to a track start of a particular track 620 may be stored in a track identification field 410 on a track. The number of skipped sectors on a track and a location of the sectors skipped on a particular track 620 may also be stored in a track identification field 410 on a track. A table may be used to store a number of sectors skipped before a selected cylinder start. The starting cylinder 230, 231, 232 may be adjusted by the number of cylinders skipped prior to the estimated start cylinder 230, 231, 232. The number of sectors skipped prior to the location of the cylinder start 700 and a number of sectors skipped in the cylinders prior to the cylinder start are subtracted from the logical block address to determine a quantity. This quantity is divided by a number of sectors within a track associated with the cylinder 230, 231, 232 to estimate a track location for the logical block address 922. A seek is performed to the head associated with the estimated track location. At the track location, the number of sectors skipped within the cylinder 230, 231, 232 prior to the estimated track location 700 is determined and added to the beginning sector within the track. The number of sectors skipped on the track is also determined 520, 521, 522, 523, 524, 525, 526, 527. A head switch to another track 924, 930 is performed if the number of sectors skipped within the cylinder 230, 231, 232 prior to the track and the number of sectors to be skipped before the logical block address plus the number of sectors from the beginning logical block address associated with the track to the selected logical block address is greater than a number of sectors associated with the track.

A method for avoiding defective sectors on the disc of a disc drive includes skipping over defective sectors, and storing the number of defective sectors skipped before a cylinder 230, 231, 232 in a sector skip table 700. The method also includes skipping defective cylinders, and storing the number of cylinders skipped before in a cylinder skip table 700. A target cylinder 230, 231, 232 is estimated from a number sectors skipped within the cylinders previous to the target cylinder 230, 231, 232, and from a number of skipped cylinders. The number of sectors skipped within a cylinder 230, 231, 232 before a track start is stored in a track identification field 410 on the track.

A disc 134 within a disc drive 100 has a plurality of tracks 220, 221, 222. A track identification field is associated with each of the plurality of tracks 220, 221, 222. The track identification field 410 includes information regarding the number and position of defective sectors on the track. The track identification field 410 may also include information regarding the number of defective sectors skipped within a cylinder 230, 231, 232 prior to the start of the track.

Most generally, a disc drive includes at least one disc 134 having defective sectors thereon and a device 170 for mapping logical block addresses to a physical location on the at least one disc.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for mapping logical block addresses to an actual location on a disc drive comprising the steps of:
   (a) dividing a logical block address by a number of sectors within a cylinder to estimate a starting cylinder location for the selected logical block address; and
   (b) determining a number of skipped defective sectors that have occurred prior to a cylinder start;
   (c) adding the number of defective sectors skipped prior to the cylinder start to a beginning sector location of the cylinder;
   (d) adjusting the starting cylinder by the number of cylinders skipped prior to the estimated start cylinder;
   (e) subtracting the number of sectors skipped prior to the location of the cylinder start and a number of sectors in the cylinders prior to the cylinder start from the logical block address to determine a quantity;
   (f) dividing the quantity by a number of sectors within a track associated with the cylinder to estimate a track location for the logical block address; and
   (g) seeking to the head associated with the estimated track location.

2. The method of claim 1 wherein the adjusting step (d) includes (d)(i) referring to a cylinder skip table which stores the number of cylinders skipped prior to a cylinder.

3. The method of claim 1 further comprising the step of (h) determining the number of sectors skipped within the cylinder prior to the estimated track location and adding this to the beginning sector within the track.

4. The method of claim 1 wherein the determining step (h) includes (h)(i)storing the number of sectors skipped within the cylinder prior to the beginning of the track in a track identification field at the track.

5. The method of claim 1 further comprising the step (i) seeking to another track within the cylinder when the number of sectors that must be added to a beginning track location to adjust for skipped sectors pushes the logical block address to a physical address associated with another track.

6. The method of claim 1 wherein the determining step (b) further comprises referring to a table which stores a number of sectors skipped before a selected cylinder start.

7. A method for mapping logical block addresses to an actual location on a disc drive comprising the steps of:
   (a) dividing a logical block address by a number of sectors within a cylinder to estimate a starting cylinder location for the selected logical block address;
   (b) determining a number of skipped defective sectors that have occurred prior to a cylinder start;
   (c) adding the number of defective sectors skipped prior to the cylinder start to a beginning sector location of the cylinder;
   (d) storing a number of sectors skipped on a particular track; and
   (e) adding the number of sectors on the track that have been skipped to the number of sectors skipped prior to the cylinder start.

8. The method of claim 7 the storing step (d) further comprises (d)(i) storing the number of sectors skipped prior to a track start of a particular track in a track identification field on a track.

9. The method of claim 7 the storing step (d) further comprises (d)(i) storing the number of skipped sectors on a track and a location of the sectors skipped on a particular track in a track identification field on a track.

10. A method for mapping logical block addresses to an actual location on a disc drive comprising the steps of:
   (a) dividing a logical block address by a number of sectors within a cylinder to estimate a starting cylinder location for the selected logical block address;
   (b) determining a number of skipped defective sectors that have occurred prior to a cylinder start;
   (c) adding the number of defective sectors skipped prior to the cylinder start to a beginning sector location of the cylinder;
   (d) adjusting the starting cylinder by the number of cylinders skipped prior to the estimated start cylinder;
   (e) subtracting the number of sectors skipped prior to the location of the cylinder start and a number of sectors in the cylinders prior to the cylinder start from the logical block address to determine a quantity;

(f) dividing the quantity by a number of sectors within a track associated with the cylinder to estimate a track location for the logical block address;

(g) seeking to the head associated with the estimated track location;

(h) determining the number of sectors skipped within the cylinder prior to the estimated track location and adding this to the beginning sector within the track;

(i) determining the number of sectors skipped on the track; and (j) performing a head switch to another track if the number of sectors skipped within the cylinder prior to the track and the number of sectors to be skipped before the logical block address plus the number of sectors from the beginning logical block address associated with the track to the selected logical block address is greater than a number of sectors associated with the track.

11. A method for avoiding defective sectors on the disc of a disc drive comprising the steps of:

(a) skipping over defective sectors;

(b) storing the number of defective sectors skipped before a cylinder in a sector skip table;

(c) skipping defective cylinders; and (d) storing the number of cylinders skipped before in a cylinder skip table.

* * * * *